(12) United States Patent
Kitakawa

(10) Patent No.: US 8,964,198 B2
(45) Date of Patent: Feb. 24, 2015

(54) DEVICE MANAGEMENT SYSTEM, DEVICE MANAGEMENT METHOD, AND IMAGE FORMING APPARATUS

(71) Applicant: Takehisa Kitakawa, Tokyo (JP)

(72) Inventor: Takehisa Kitakawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/763,812

(22) Filed: Feb. 11, 2013

(65) Prior Publication Data

US 2013/0215443 A1     Aug. 22, 2013

(30) Foreign Application Priority Data

Feb. 16, 2012  (JP) ................ 2012-032086

(51) Int. Cl.
*G06F 3/12* (2006.01)
*G06K 15/00* (2006.01)
*H04N 1/00* (2006.01)

(52) U.S. Cl.
CPC ....... *H04N 1/00896* (2013.01); *H04N 1/00344* (2013.01); *H04N 1/00347* (2013.01); *H04N 2201/0093* (2013.01); *H04N 2201/001* (2013.01)
USPC ........ 358/1.13; 358/1.14; 358/1.15; 358/1.16

(58) Field of Classification Search
CPC . G06F 3/1285; G06F 3/1221; H04N 1/00885; H04N 1/00899; H04N 2201/0082
See application file for complete search history.

(56) References Cited

U.S. PATENT DOCUMENTS

| | | | |
|---|---|---|---|
| 5,937,148 A | 8/1999 | Okazawa | |
| 2002/0149789 A1 | 10/2002 | Okazawa | |
| 2006/0174205 A1* | 8/2006 | Jung et al. | 715/751 |
| 2010/0316405 A1 | 12/2010 | Saeki | |
| 2011/0089922 A1 | 4/2011 | Kitakawa | |
| 2011/0116128 A1* | 5/2011 | Tamada | 358/1.15 |
| 2011/0285765 A1* | 11/2011 | Lamontagne et al. | 347/3 |

FOREIGN PATENT DOCUMENTS

| | | |
|---|---|---|
| JP | 08-137637 | 5/1996 |
| JP | 11-129581 | 5/1999 |
| JP | 2005-195906 | 7/2005 |
| JP | 2006-334931 | 12/2006 |
| JP | 2010-218418 | 9/2010 |
| JP | 2011-022559 | 2/2011 |

* cited by examiner

*Primary Examiner* — Thomas Lett
(74) *Attorney, Agent, or Firm* — Harness, Dickey & Pierce, P.L.C.

(57) ABSTRACT

A device management system for managing a plurality of image forming apparatuses each having a power save mode in which electric power is supplied from a battery includes: a process accepting unit configured to accept a process request issued to a first image forming apparatus of the image forming apparatuses; a mode determining unit configured to determine whether the first image forming apparatus is in the power save mode; a search unit configured to, when the first image forming apparatus is determined to be in the power save mode, search the image forming apparatuses for a second image forming apparatus that is not in the power save mode; and a request transfer unit configured to transfer a command to perform a process according to the process request to the second image forming apparatus.

9 Claims, 5 Drawing Sheets

DATA ABOUT BATTERY CHARGE LEVEL

| DEVICE IDENTIFICATION NUMBER | BATTERY CHARGE LEVEL | DATE AND TIME |
|---|---|---|
| APPARATUS A | 80% | 12/14/2011 18:56 |
| APPARATUS B | 65% | 12/12/2011 14:43 |
| APPARATUS C | 90% | 12/13/2011 16:56 |

DATA ABOUT BATTERY CHARGE LEVEL

| DEVICE IDENTIFICATION NUMBER | BATTERY CHARGE LEVEL | DATE AND TIME |
|---|---|---|
| APPARATUS A | 80% | 12/14/2011 18:56 |
| APPARATUS B | 65% | 12/12/2011 14:43 |
| APPARATUS C | 90% | 12/13/2011 16:56 |

DEVICE MANAGEMENT SYSTEM, DEVICE MANAGEMENT METHOD, AND IMAGE FORMING APPARATUS

CROSS-REFERENCE TO RELATED APPLICATIONS

The present application claims priority to and incorporates by reference the entire contents of Japanese Patent Application No. 2012-032086 filed in Japan on Feb. 16, 2012.

BACKGROUND OF THE INVENTION

1. Field of the Invention

The present invention relates to a device management system, a device management method, a image forming apparatus having a power save mode, and a computer-readable non-transitory recording medium containing a computer program for managing the image forming apparatus.

2. Description of the Related Art

Conventionally, apparatuses such as multifunction peripherals (MFPs) and printers have been strongly desired to be capable of saving power while the apparatus is unused. An attempt of achieving the power saving has been made by, for instance, automatically cutting off passage of electric current through a fixing device or the like of an MFP or interrupting an electric current to an unnecessary part of electric circuit when the MFP is in an unused state for a predetermined duration or longer, thereby reducing power consumption of the MFP. When an apparatus is in such a power save mode, unless the apparatus is in an abnormal state, electric power is supplied to the apparatus from a battery, a storage battery, or the like so that data stored in a volatile memory is maintained even when electric power is not supplied from a receptacle.

When an MFP is in such a power save mode, electric power is constantly applied to a network interface section of the MFP so that the MFP can accept a job from an external device (e.g., a host computer) via a network. The MFP is controlled such that when the MFP receives a job from an external device, the MFP exits the power save mode to enter a state where the MFP can execute the job.

Other example conventional techniques include a technique disclosed in Japanese Patent Application Laid-open No. H8-137637 and a technique disclosed in Japanese Patent Application Laid-open No. H11-129581.

However, the conventional apparatus such as the MFP or the printer is disadvantageous in that when the apparatus receives a command to perform printing or facsimile transmission/reception, the apparatus automatically exits the power save mode to return to a normal mode where power consumption is at a standard level. This leads to a problem that, in a situation where, for instance, a command to perform printing is frequently issued, duration of the power save mode becomes relatively short, and an effect of power saving is undesirably lessened.

There is needed to provide a device management system capable of enhancing power saving effect of image forming apparatuses and/or the like.

SUMMARY OF THE INVENTION

It is an object of the present invention to at least partially solve the problems in the conventional technology.

According to the present invention, there is provided a device management system for managing a plurality of image forming apparatuses each having a power save mode in which electric power is supplied from a battery, the device management system comprising: a process accepting unit configured to accept a process request issued to a first image forming apparatus of the image forming apparatuses; a mode determining unit configured to determine whether the first image forming apparatus is in the power save mode; a search unit configured to, when the first image forming apparatus is determined to be in the power save mode, search the image forming apparatuses for a second image forming apparatus of the image forming apparatuses that is not in the power save mode; and a request transfer unit configured to transfer a command to perform a process according to the process request to the second image forming apparatus.

The invention also provides an image forming apparatus having a power save mode in which electric power is supplied from a battery, the image forming apparatus comprising: a process accepting unit configured to accept a process request issued to the image forming apparatus; a mode determining unit configured to, when the process request is accepted, determine whether the image forming apparatus is in the power save mode; a search unit configured to, when the image forming apparatus is determined to be in the power save mode, search other image forming apparatuses for an operating image forming apparatus that is not in the power save mode; and a request transfer unit configured to transfer a command to perform a process requested by the process request to the operating image forming apparatus.

The invention also provides a device management method for managing a plurality of image forming apparatuses each having a power save mode in which electric power is supplied from a battery, the device management method comprising: accepting a process request issued to a first image forming apparatus of the image forming apparatuses; determining whether the first image forming apparatus is in the power save mode; searching, when the first image forming apparatus is determined to be in the power save mode, the image forming apparatuses for a second image forming apparatus of the image forming apparatuses that is not in the power save mode; and transferring a command to perform a process according to the process request to the second image forming apparatus.

In addition, the invention also provides a non-transitory computer-readable recording medium that contains a computer program that cause a computer to perform a method for managing a plurality of image forming apparatuses each having a power save mode in which electric power is supplied from a battery, the method comprising: accepting a process request issued to a first image forming apparatus of the image forming apparatuses; determining whether the first image forming apparatus is in the power save mode; searching, when the first image forming apparatus is determined to be in the power save mode, the image forming apparatuses for a second image forming apparatus of the image forming apparatuses that is not in the power save mode; and transferring a command to perform a process according to the process request to the second image forming apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
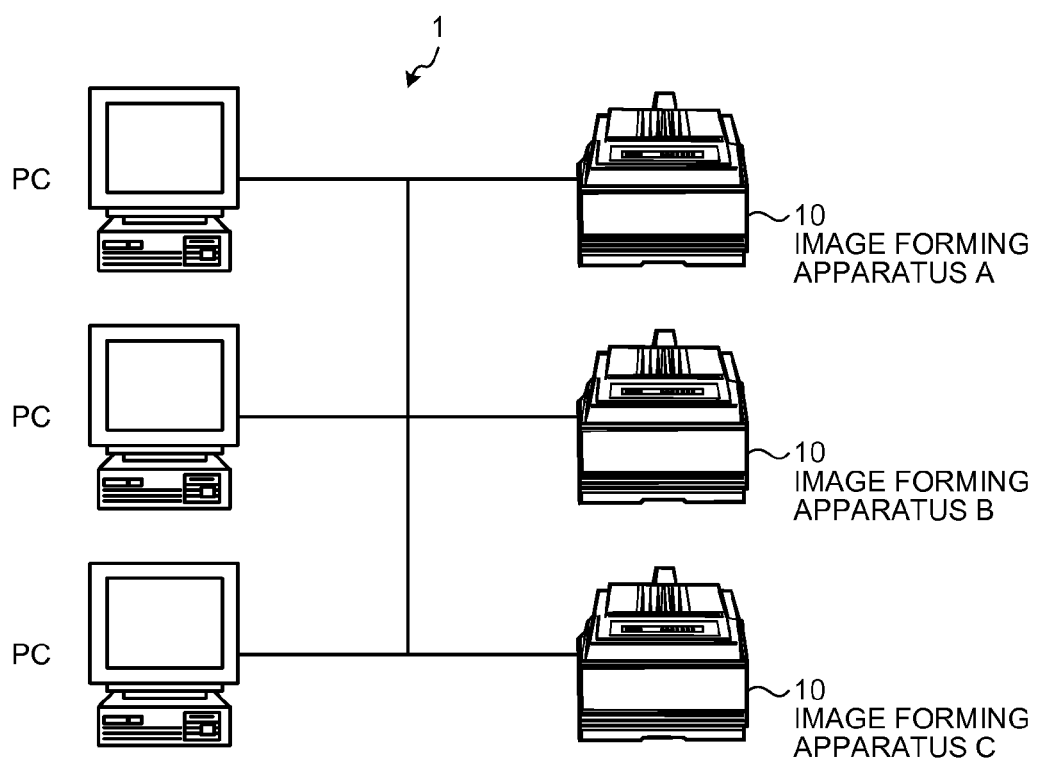
FIG. 1 is a block diagram illustrating an entire configuration of a device management system according to a first embodiment of the present invention.

Exemplary embodiments of the present invention are described in detail below with reference to the accompanying drawings. FIG. 1 is a block diagram illustrating an entire configuration of a device management system 1 according to a first embodiment of the present invention. The device management system 1 manages a plurality of image forming apparatuses 10. Each of the image forming apparatuses 10 performs processes including scanning a placed document to make a copy of the document and producing a printout of data according to a print command transmitted from a personal computer (PC). The image forming apparatuses 10 and the PCs are connected to one another via a network. In the first embodiment, a structure for carrying out the function of the device management system 1 is provided in each of the image forming apparatus 10.

Figure 2:
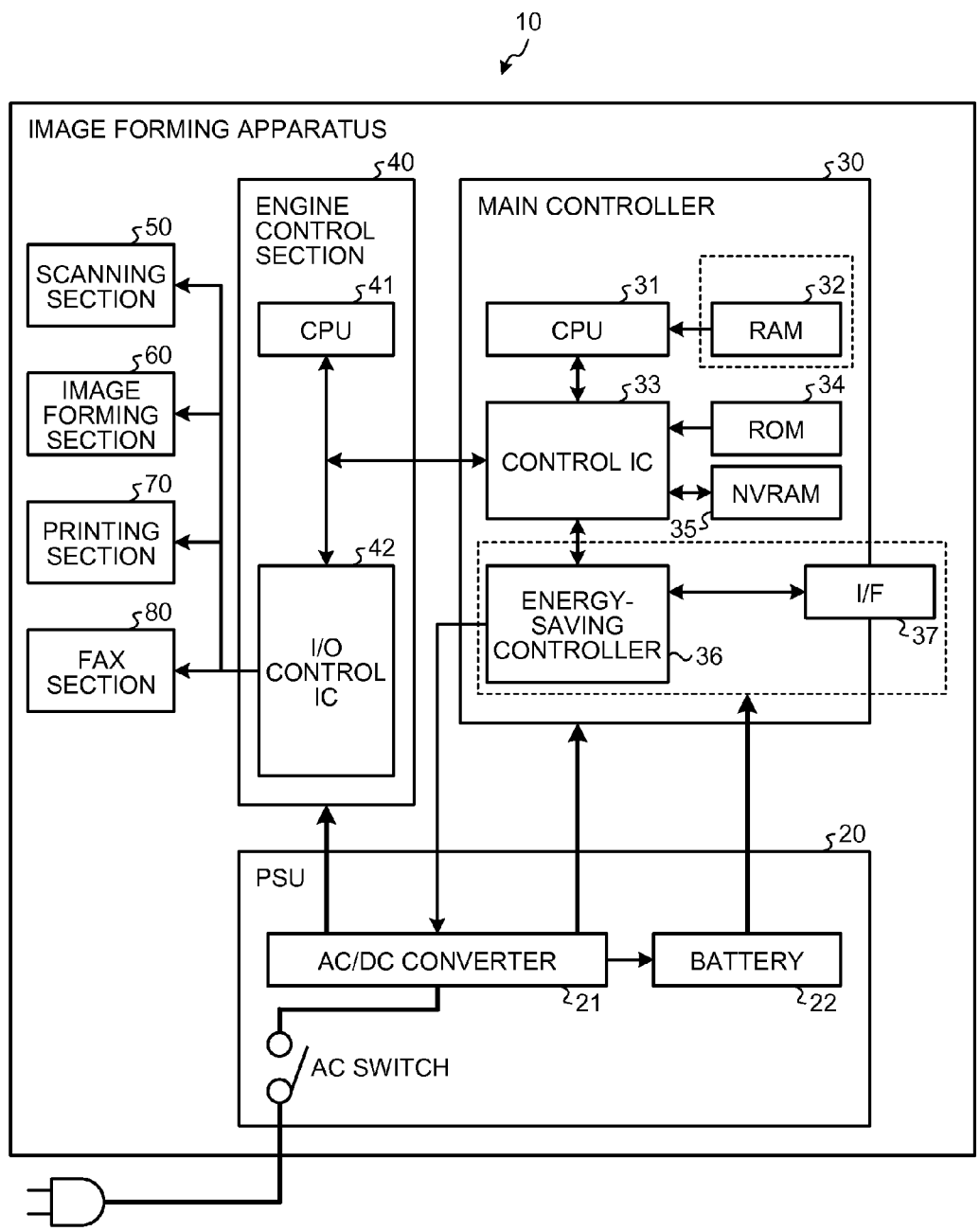
FIG. 2 is a block diagram illustrating a configuration of hardware and functional blocks of an image forming apparatus.

FIG. 2 is a block diagram illustrating a configuration of hardware and functional blocks of the image forming apparatus 10. As illustrated in FIG. 2, the image forming apparatus 10 includes a power supplying unit (PSU) 20, a main controller 30, an engine control section 40, a scanning section 50, an image forming section 60, a printing section 70, and a facsimile transmission/reception section (hereinafter, "fax section") 80.

The PSU 20 includes an alternating-current/direct-current (AC/DC) converter 21 and a battery 22. Electric power is normally supplied to the main controller 30 and the engine control section 40 via the AC/DC converter 21. However, in a power save mode, whereas electric power is supplied from the battery 22 to an energy-saving controller 36 and an interface (I/F) 37 of the main controller 30, the engine control section 40 is not supplied with electric power. In a state where the image forming apparatus 10 has exited the power save mode, electric power is supplied to the battery 22 via the AC/DC converter 21 to recharge the battery 22.

The main controller 30 includes a central processing unit (CPU) 31, a random access memory (RAM) 32, a control integrated circuit (IC) 33, a read only memory (ROM) 34, a non-volatile RAM (NVRAM) 35, the energy-saving controller 36, and the I/F 37. The main controller 30 principally controls communications, data storing, memory release, and the like. The energy-saving controller 36 issues a command to stop electric power supply to the AC/DC converter 21 when the power save mode starts. Meanwhile, the power save mode starts when a duration of an unoperated state exceeds a predetermined period of time or when a user enters an instruction to save power by operating an operation section. A command to start the power save mode is output from the control IC 33 to the energy-saving controller 36. The energy-saving controller 36 includes a structure for carrying out device management control. Specifically, when a process request to perform copying, facsimile transmission/reception, printing, or the like is issued to a first one of the image forming apparatuses 10 that is in the power save mode, the first one transfers a command to perform a process according to the process request to a second one of the image forming apparatuses 10 that is not in the power save mode, thereby causing the second one to perform the process, while the first one remains in the power save mode. When all of other image forming apparatuses 10 are in the power save mode, a third one of the image forming apparatuses 10 that is lowest in terms of battery charge level among the image forming apparatuses 10, or, put another way, that has obtained a largest power saving effect by the power save mode, is selected. The process request is transferred to the third one. The structure for implementing this control will be described later.

The engine control section 40 includes a CPU 41 and an input-output (I/O) control IC 42. The engine control section 40 principally controls hardware such as motors for driving the scanning section 50, the image forming section 60, the printing section 70, and the fax section 80. The engine control section 40 is on standby in the power save mode. The scanning section 50 scans a document placed on an exposure glass and performs conversion to obtain image data. The image forming section 60 includes, for instance, an Application Specific Integrated Circuit (ASIC), and a monochrome plotter, a one-drum color plotter, or a four-drum color plotter. The image forming section 60 performs various image processing such as error diffusion and gamma conversion on the image data representing an image read by the scanning section 50 or image data received from an external device. The printing section 70 delivers a sheet of paper from a paper cassette to an image fixing section and fixes the image formed by the image forming section 60 onto the sheet. The fax section 80 performs facsimile transmission/reception to/from an external device (not shown).

Figures 3, 4:
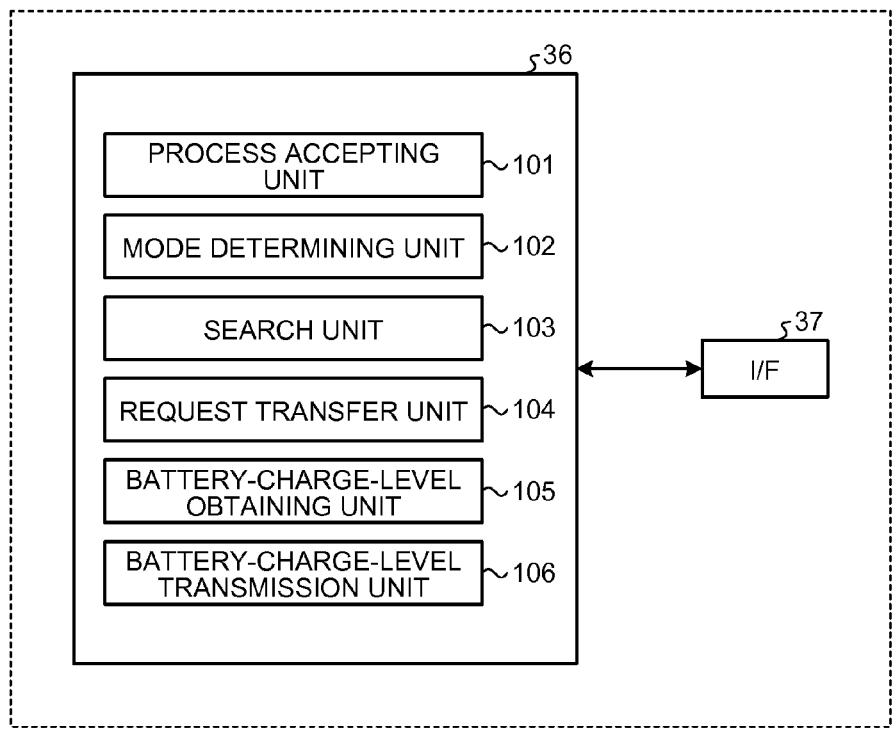
FIG. 3 is a block diagram illustrating in detail a functional configuration of an energy-saving controller.
FIG. 4 is a table illustrating a data structure of stored data about battery charge levels.

FIG. 3 is a block diagram illustrating in detail a functional configuration of the energy-saving controller 36. As illustrated in FIG. 3, the energy-saving controller 36 includes a process accepting unit 101, a mode determining unit 102, a search unit 103, a request transfer unit 104, a battery-charge-level obtaining unit 105, and a battery-charge-level transmission unit 106. These units are operable even in the power save mode because the units are supplied with electric power from the battery 22. The process accepting unit 101 accepts a process request input via the I/F 37 to the image forming apparatus 10. The mode determining unit 102 determines whether the image forming apparatus 10 is in the power save mode. The search unit 103 searches the other image forming apparatuses 10 on the same network to find whether the image forming apparatuses 10 include an image forming apparatus that is not in the power save mode. When a process request is transmitted to the image forming apparatus 10 that is in the power save mode, the request transfer unit 104 transfers a command to perform a process according to the process request to another one of the image forming apparatuses 10 that is not in the power save mode.

The battery-charge-level obtaining unit 105 obtains a battery charge level of each of the plurality of image forming apparatuses 10. A method for obtaining a battery charge level is described below. When one of the image forming apparatuses 10 transits to the power save mode, the battery-charge-level transmission unit 106 of the one image forming apparatus 10 transmits a battery charge level of the one image forming apparatus 10, and date and time of a transition instant when the transition to the power save mode has occurred to the other image forming apparatuses 10. FIG. 4 illustrates a data structure of data about battery charge levels transmitted by the battery-charge-level transmission units 106 and stored in each of the image forming apparatuses 10. As illustrated in FIG. 4, date and time when transition to the power save mode has occurred and a battery charge level at the transition instant are stored as being associated with corresponding one of the image forming apparatuses 10 for each of the image forming apparatuses 10. Formats of the data are not limited to those illustrated in FIG. 4.

Stored is data about the battery charge levels each obtained at a transition instant when transition to the power save mode has occurred. Accordingly, at a point in time when a process request is issued to the process accepting unit 101, the battery charge levels of the image forming apparatuses 10 at the point in time are calculated.

A method for calculating the battery charge levels is described below. Elapsed time from acceptance of the process request to transition to the power save mode is calculated. Power consumption per unit time that has been set for each of the image forming apparatuses is multiplied by the calculated time. A battery charge level at an acceptance instant when the process request is accepted is calculated by subtracting a result of the multiplication from the battery charge level at the transition instant when the image forming apparatus 10 transits to the power save mode. When all of the image forming apparatuses 10 on the same network are in the power save mode, the request transfer unit 104 transfers the process request to a third one of the image forming apparatuses 10 that is lowest in terms of the battery charge level at the acceptance instant obtained and calculated by the battery-charge-level obtaining unit 105 among the image forming apparatuses 10. The third one to which the process request is transferred exits the power save mode and performs the process.

Figure 5:
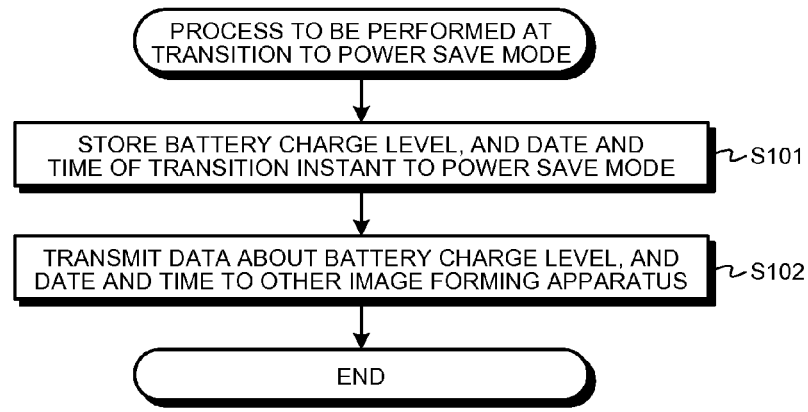
FIG. 5 is a flowchart of a procedure of a process to be performed by the image forming apparatus at transition to a power save mode.

Procedures of processes to be performed in the device management system 1 described above are described below with reference to FIGS. 5 to 8. FIG. 5 is a flowchart of a procedure of a process to be performed by the image forming apparatus 10 at transition to the power save mode. As illustrated in FIG. 5, the energy-saving controller 36 of the image forming apparatus 10 stores a battery charge level, and date and time at a transition instant when the image forming apparatus 10 transits to the power save mode first (Step S101). The data is stored in a storage area such as the RAM 32 or a hard disk drive (HDD) of the image forming apparatus 10. Subsequently, the battery-charge-level transmission unit 106 transmits stored data about the battery charge level, and the date and time to the other image forming apparatuses 10 (Step S102). The other image forming apparatuses 10 receive the data and store it in a similar manner. Note that each of the image forming apparatuses 10 can receive the data because, even in the power save mode, electric power is supplied from the battery 22 to the I/Fs 37 that carry out communications with external entity.

Figure 6:
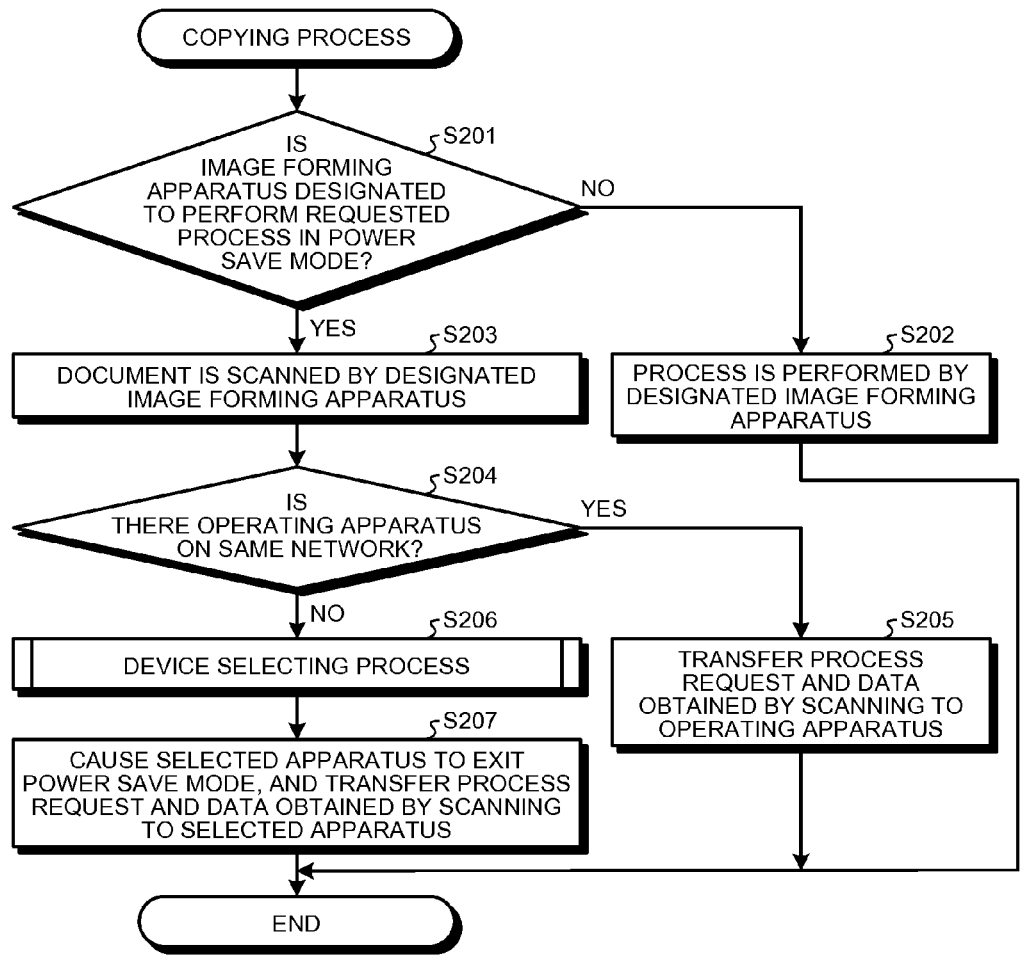
FIG. 6 is a flowchart of a procedure of a process related to a copying process.

FIG. 6 is a flowchart of a procedure of a process to be performed when the image forming apparatus 10 performs a copying process. Firstly, the mode determining unit 102 determines whether a first one, to which a copying process request is issued, of the image forming apparatuses 10 is in the power save mode (Step S201). When the first one of the image forming apparatuses 10 is not in the power save mode (No at Step S201), the first one to which the process request is issued performs the copying process (Step S202). When the first one is in the power save mode (Yes at Step S201), only the scanning section 50 of the first one that is designated to perform copying is caused to exit the power save mode. The scanning section 50 scans a document (Step S203). Subsequently, the search unit 103 searches the image forming apparatuses 10 on the same network for a second one of the image forming apparatuses 10 that is not in the power save mode but operating (Step S204). When, as a result of the search, it is determined that there is the second one of the image forming apparatuses 10 that is operating (Yes at Step S204), the request transfer unit 104 transfers the process request and data obtained by scanning the document to the second one that is operating (Step S205).

When, as a result of the search, it is determined that none of the image forming apparatuses 10 is operating (No at Step S204), a device selecting process is performed to select a third one of the image forming apparatuses 10 that is lowest in terms of the battery charge level among the image forming apparatuses 10 (Step S206). The device selecting process will be described in detail later. The request transfer unit 104 causes the selected third one of the image forming apparatuses 10 to exit the power save mode, and transfers the process request and the data obtained by scanning the document to the third one that has exited the power save mode (Step S207). The reason why document scanning is performed by the first one of the image forming apparatuses 10 to which the process request is issued is because it is necessary to actually transfer document data to the second or third one of the image forming apparatuses 10.

Figure 7:
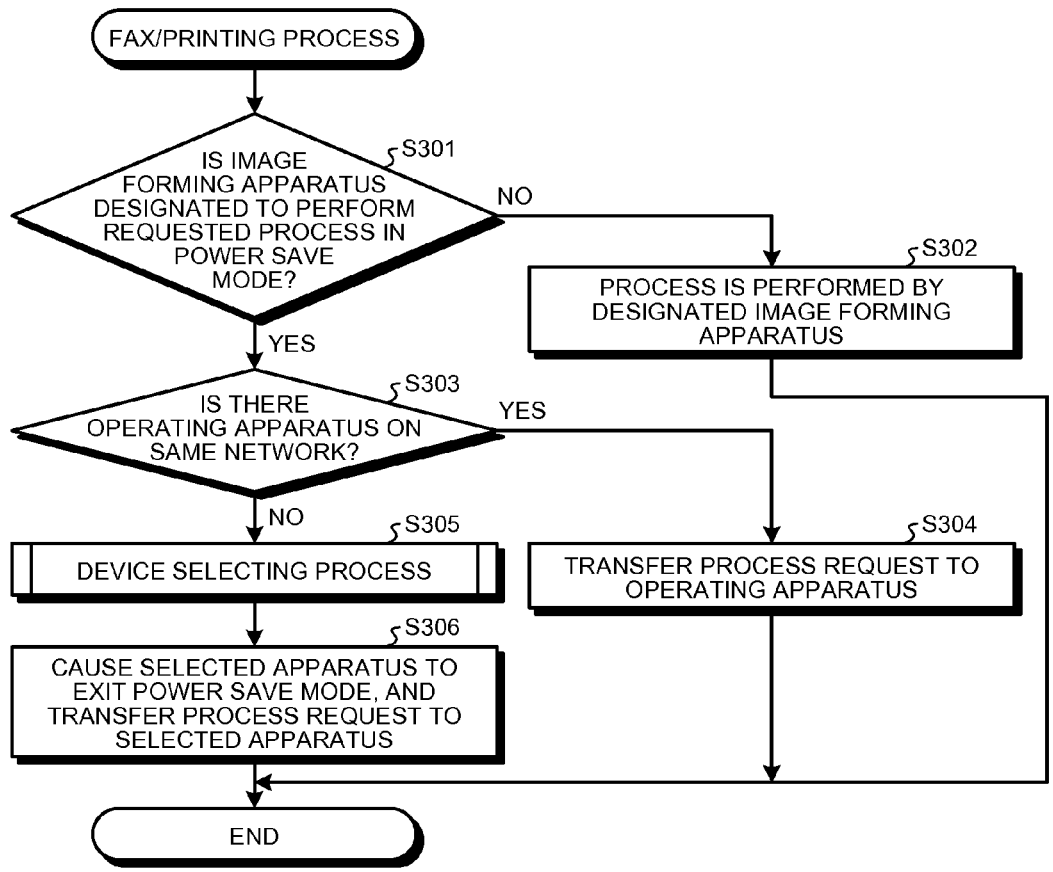
FIG. 7 is a flowchart of a procedure of a process related to a printing process or a facsimile transmission/reception process.

FIG. 7 is a flowchart of a procedure of a process to be performed when the image forming apparatus 10 performs a printing process or a facsimile transmission/reception process. Firstly, the mode determining unit 102 determines whether a first one, to which a printing process request or a facsimile transmission/reception process request is issued, of the image forming apparatuses 10 is in the power save mode (Step S301). When the first one of the image forming apparatuses 10 is not in the power save mode (No at Step S301), the first one to which the process request is issued performs a process according to the process request (Step S302). When the first one is in the power save mode (Yes at Step S301), the search unit 103 searches the image forming apparatuses 10 on the same network for a second one of the image forming apparatuses 10 that is not in the power save mode but operating (Step S303). When, as a result of the search, it is determined that there is the second one of the image forming apparatuses 10 that is operating (Yes at Step S303), the request transfer unit 104 transfers the process request to the second one that is operating (Step S304).

When, as a result of the search, it is determined that none of the image forming apparatuses 10 is operating (No at Step S303), the device selecting process is performed to select a third one of the image forming apparatuses 10 that is lowest in terms of the battery charge level among the image forming apparatuses 10 (Step S305). The request transfer unit 104 causes the selected third one of the image forming apparatuses 10 to exit the power save mode, and transfers the process request to the third one that has exited the power save mode (Step S306).

Figure 8:
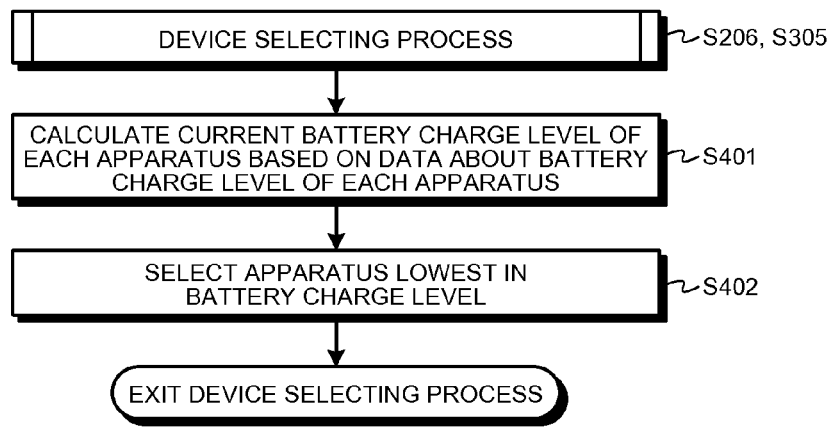
FIG. 8 is a flowchart of a procedure of a device selecting process.

FIG. 8 is a flowchart of a procedure of the device selecting process to be performed at Step S206 and Step S305. To select an apparatus to which the process request is to be transferred, the battery-charge-level obtaining unit 105 calculates a current battery charge level of each of the image forming apparatuses 10 using the data about the battery charge levels (Step S401). Subsequently, the battery-charge-level obtaining unit 105 selects the third one of the image forming apparatuses 10 that is lowest in terms of the battery charge level among the image forming apparatuses 10 as a destination to which the process request is to be transferred. Then, control returns to the requested process (Step S402).

In the device management system 1 according to the embodiment described above, when the first one of the image forming apparatuses 10 to which a process request is issued is in the power save mode, the process request is transferred to the second one of the image forming apparatuses 10 that is operating, thereby preventing the first one from exiting the power save mode. Accordingly, duration of the power save mode is maximized, and a higher power saving effect can be obtained.

When all of the image forming apparatuses 10 on the same network are in the power save mode, the third one of the image forming apparatuses 10 that is lowest in terms of the current battery charge level among the image forming apparatuses 10, or, in other words, that has obtained a largest power saving effect by the power save mode among the image forming apparatuses 10, is caused to exit the power save mode. The process request is transferred to the third one. Accordingly, chances that one of the image forming apparatuses 10 that is in the power save mode for a short duration exits the power save mode can be minimized.

The embodiment described above can be modified as follows as appropriate.

For instance, in the process to be performed at transition to the power save mode illustrated in FIG. 5, the data about the battery charge level is not necessarily transmitted to all the image forming apparatuses 10. Alternatively, a configuration in which the data is transmitted to a server apparatus that is added to the system can be employed. When this configuration is employed, the device selecting process further includes a step at which the battery-charge-level obtaining unit 105 obtains the data about the battery charge levels, and date and time of transition instant when transition to the power save mode has occurred from the server apparatus.

In the process to be performed at transition to the power save mode, the data about the battery charge level is not necessarily transmitted to all the image forming apparatuses 10. Alternatively, a configuration in which the data is transmitted only to specific one of the image forming apparatuses 10 can be employed. The specific one can be, for instance, one of which IP address is largest or smallest among the image forming apparatuses 10. When this configuration is employed, the device selecting process further includes a step at which the battery-charge-level obtaining unit 105 obtains the data from the image forming apparatus 10 that has the data.

A configuration in which the mode determining unit 102, the search unit 103, the request transfer unit 104, and the battery-charge-level obtaining unit 105 are included in the server apparatus rather than in the image forming apparatus 10 can alternatively be employed. When this configuration is employed, the server apparatus can employ a typical computer hardware configuration that includes a control device such as a CPU, a storage device such as a ROM and a RAM, an external storage device such as an HDD or a compact disk (CD) drive, a display device, and an input device such as a keyboard and a mouse.

The techniques described herein may be implemented in a computer program product embodied on a non-transitory computer-readable recording medium stored therein program codes as installable or executable file(s) for execution by, or to control operation of, the server apparatus, the image forming apparatuses, and the like. The computer-readable recording medium can be, for instance, a CD-ROM, a flexible disk (FD), a CD-recordable (CD-R), or a digital versatile disk (DVD).

The program codes for execution by, or to control operation of, the server apparatus, the image forming apparatuses, and the like may be configured to be stored in a computer connected to a network such as the Internet to be downloaded over the network. The program codes for execution by, or to control operation of, the server apparatus, the image forming apparatuses, and the like may be configured to be provided or distributed over a network such as the Internet.

The program codes for execution by, or to control operation of, the server apparatus, the image forming apparatuses, and the like may be configured to be provided as being stored in a ROM or the like in advance.

The program codes for execution by, or to control operation of, the server apparatus, the image forming apparatuses, and the like of the embodiment have a module structure made up of the units described above (the mode determining unit 102, the search unit 103, the request transfer unit 104, and the battery-charge-level obtaining unit 105). From the viewpoint of actual hardware, the CPU (processor) reads out the program codes from the recoding medium and executes the program codes to load the units on a main memory device, thereby generating the mode determining unit 102, the search unit 103, the request transfer unit 104, and the battery-charge-level obtaining unit 105 on the main memory device.

The techniques described herein may be implemented in a non-transitory computer-readable recording medium stored therein program codes installable or executable by the server apparatus, the image forming apparatuses, and the like for execution by, or to control operation of, the server apparatus, the image forming apparatuses, and the like. The computer-readable recording medium can be, for example, a CD-ROM, an FD, a CD-R, or a DVD.

An example where an image forming apparatus according to an aspect of the present invention is embodied on an MFP that has at least two functions of a copier function, a printer function, a scanner function, and a facsimile function has been described above. However, the image forming apparatus is not limited to such an MFP, and may be any image forming apparatus such as a copier, a printer, a scanner, or a facsimile.

According to an aspect of the present invention, an effect that a power saving effect is enhanced is obtained because a power save mode of an image forming apparatus and/or the like is maintained long.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device management system configured to manage a plurality of apparatuses each having a power save mode in which electric power is supplied from a battery, the device management system comprising:
a process accepting unit configured to accept a process request issued to a first apparatus of the apparatuses;
a mode determining unit configured to determine whether the first image forming apparatus is in the power save mode;
a search unit configured to, when the first apparatus is in the power save mode, search for a second apparatus of the apparatuses that is not in the power save mode;
a battery-level obtaining unit configured to obtain a battery charge level of each of the apparatuses;
a request transfer unit configured to, transfer the process request issued to the first apparatus to the second apparatus if the second apparatus that is not in the power save mode is found by the search, and transfer the process request to a third apparatus of the apparatuses that is lowest in terms of the battery charge level, if the second apparatus that is not in the power save mode is not found by the search; and a battery-charge-level transmission unit, wherein each of the apparatuses includes the battery-charge-level obtaining unit, when one of the apparatuses transitions to the power save mode, the battery-charge-level transmission unit is configured to transmit to other a apparatuses a battery charge level at a transition instant, the transition instant being an instant when the one apparatus transitions to the power save mode, and date and time of the transition instant, and when the first apparatus accepts the process request, the battery-charge-level obtaining unit of the first apparatus is configured to calculate a battery charge level at an acceptance instant, the acceptance instant being an instant when the process request is accepted of each of the apparatuses using the battery charge level at the transition instant, and the date and time of the transition instant transmitted by the battery-charge-level transmission unit.

2. The device management system according to claim 1, wherein the process request is a request to perform copying, the copying including scanning a document to produce a copy of the document, and when a command to perform the copying is issued, after the first apparatus has obtained print data by scanning the document, the request transfer unit is configured to transmit the print data and a command to perform the process according to the process request to the second apparatus.

3. The device management system according to claim 1, wherein the process request is a request to perform printing or facsimile transmission.

4. The device management system according to claim 1, wherein the request transfer unit is configured to transfer the process request issued to the first apparatus to the second apparatus such that the process request is transferred while the first apparatus maintains the power save mode.

5. An image forming apparatus having a power save mode in which electric power is supplied from a battery, the image forming apparatus comprising:

a process accepting unit configured to accept a process request issued to the image forming apparatus;

a mode determining unit configured to, when the process request is accepted, determine whether the image forming apparatus is in the power save mode;

a search unit configured to, when the image forming apparatus is in the power save mode, search other image forming apparatuses for an operating image forming apparatus that is not in the power save mode;

a battery-level obtaining unit configured to obtain a battery charge level of each of the image forming apparatus, a request transfer unit configured to, transfer the process request to the operating image forming apparatus, if the operating image forming apparatus that is not in the power save mode is found by the search, and transfer the process request to another image forming apparatus of the other image forming apparatuses that is lowest in terms of the battery charge level, if the operating image forming apparatus that is not in the power save mode is not found by the search; and a battery-charge-level transmission unit, wherein each of the image forming apparatuses includes the battery-charge-level obtaining unit, when one of the image forming apparatuses transitions to the power save mode, the battery-charge-level transmission unit is configured to transmit to the other image forming apparatuses a battery charge level at a transition instant, the transition instant being an instant when the one image forming apparatus transitions to the power save mode, and date and time of the transition instant, and when the image forming apparatus accepts the process request, the battery-charge-level obtaining unit of the image forming apparatus is configured to calculate a battery charge level at an acceptance instant, the acceptance instant being an instant when the process request is accepted, of each of the image forming apparatuses using the battery charge level at the transition instant, and the date and time of the transition instant transmitted by the battery-charge-level transmission unit.

6. The image forming apparatus according to claim 5, wherein the request transfer unit is configured to transfer the process request issued to the image forming apparatus to the operating image forming apparatus such that the process request is transferred while the image forming apparatus maintains the power save mode.

7. A device management method for managing a plurality of apparatuses each having a power save mode in which electric power is supplied from a battery, the device management method comprising:

accepting a process request issued to a first apparatus of the apparatuses;

determining whether the first apparatus is in the power save mode;

searching, when the first apparatus is in the power save mode, for a second apparatus of the apparatuses that is not in the power save mode; and obtain a battery charge level of each of the apparatuses;

transfer the process request issued to the first apparatus to the second apparatus, if the second apparatus that is not in the power save mode is found by the search, and transfer the process request to a third apparatus of the apparatuses that is lowest in terms of the battery charge level, if the second apparatus that is not in the power save mode is not found by the search;

transmit to other apparatuses a battery charge level at a transition instant, when one of the apparatuses transitions to the power save mode, the transition instant being an instant when the one apparatus transitions to the power save mode and date and time of the transition instant; and calculate a battery charge level at an acceptance instant, when the first apparatus accepts the process request, the acceptance instant being an instant when the process request is accepted of each of the apparatuses using the battery charge level at the transition instant, and the date and time of the transition instant transmitted by the battery-charge-level transmission unit.

8. The device management according to claim 7, wherein the transferring transfers the process request issued to the first apparatus to the second apparatus such that the process request is transferred while the first apparatus maintains the power save mode.

9. A device management system configured to manage a plurality of apparatuses each having a power save mode in which electric power is supplied from a battery, the device management system comprising:
- a process accepting unit configured to accept a process request issued to a first apparatus of the apparatuses;
- a mode determining unit configured to determine whether the first apparatus is in the power save mode;
- a search unit configured to, when the first apparatus is in the power save mode, search for a second apparatus of the apparatuses that is not in the power save mode;
- a battery-level obtaining unit configured to obtain a battery charge level of each of the apparatuses;
- a request transfer unit configured to,
    - transfer the process request issued to the first apparatus to the second apparatus, if the second apparatus that is not in the power save mode is found by the search, and
    - transfer the process request to a third apparatus of the apparatuses that is lowest in terms of the battery charge level, if the second apparatus that is not in the power save mode is not found by the search;
- a server apparatus; and
- a battery-level transmission unit, wherein
    - when one of the apparatuses transitions to the power save mode, the battery-level transmission unit transmits to the server apparatus a battery level at a transition instant, the transition instant being an instant when the one apparatus transitions to the power save mode, and date and time of the transition instant, and
    - when the first apparatus accepts the process request, the battery-charge-level obtaining unit is configured to,
        - obtain the battery charge level at the transition instant, and the date and time of the transition instant of each of the apparatuses from the server apparatus, and
        - calculate a battery charge level at an acceptance instant, the acceptance instant being an instant when the process request is accepted, of each of the apparatuses using the battery charge level at the transition instant, and the date and time of the transition instant.

\* \* \* \* \*